United States Patent [19]

Takeuchi et al.

[11] Patent Number: 5,258,437
[45] Date of Patent: Nov. 2, 1993

[54] SILICONE PUTTY COMPOSITIONS

[75] Inventors: Yoshio Takeuchi, Takasaki; Masaharu Takahashi, Annaka, both of Japan

[73] Assignee: Shin-Etsu Chemical Co., Ltd., Tokyo, Japan

[21] Appl. No.: 904,099

[22] Filed: Jun. 25, 1992

[30] Foreign Application Priority Data

Jun. 27, 1991 [JP] Japan .................. 3-181653

[51] Int. Cl.$^5$ .............................. C08K 3/38
[52] U.S. Cl. ...................... 524/405; 524/487; 524/490; 524/491; 524/701; 524/848
[58] Field of Search ............ 524/701, 848, 405, 487, 524/490, 491

[56] References Cited

U.S. PATENT DOCUMENTS 4,863,985  9/1989  Pouchol et al. .................. 524/405
4,891,400  1/1990  Schwabe et al. .................. 524/848

Primary Examiner—Melvyn I. Marquis
Attorney, Agent, or Firm—Millen, White, Zelano & Branigan

[57] ABSTRACT

A silicone putty composition having high impact resilience immediately after preparation and providing a soft silicone putty having low plasticity is obtained by blending (1) a diorganosiloxane of the formula:

$$R_n SiO_{(4-n)/2}$$

wherein R is a substituted or unsubstituted monovalent hydrocarbon group and n is a number of from 1.98 to 2.02, (2) an organopolysiloxane having a terminal alkoxy group, (3) boric acid or boron oxide, and (4) liquid paraffin. The composition is suited for use in toys and dampers.

9 Claims, 1 Drawing Sheet

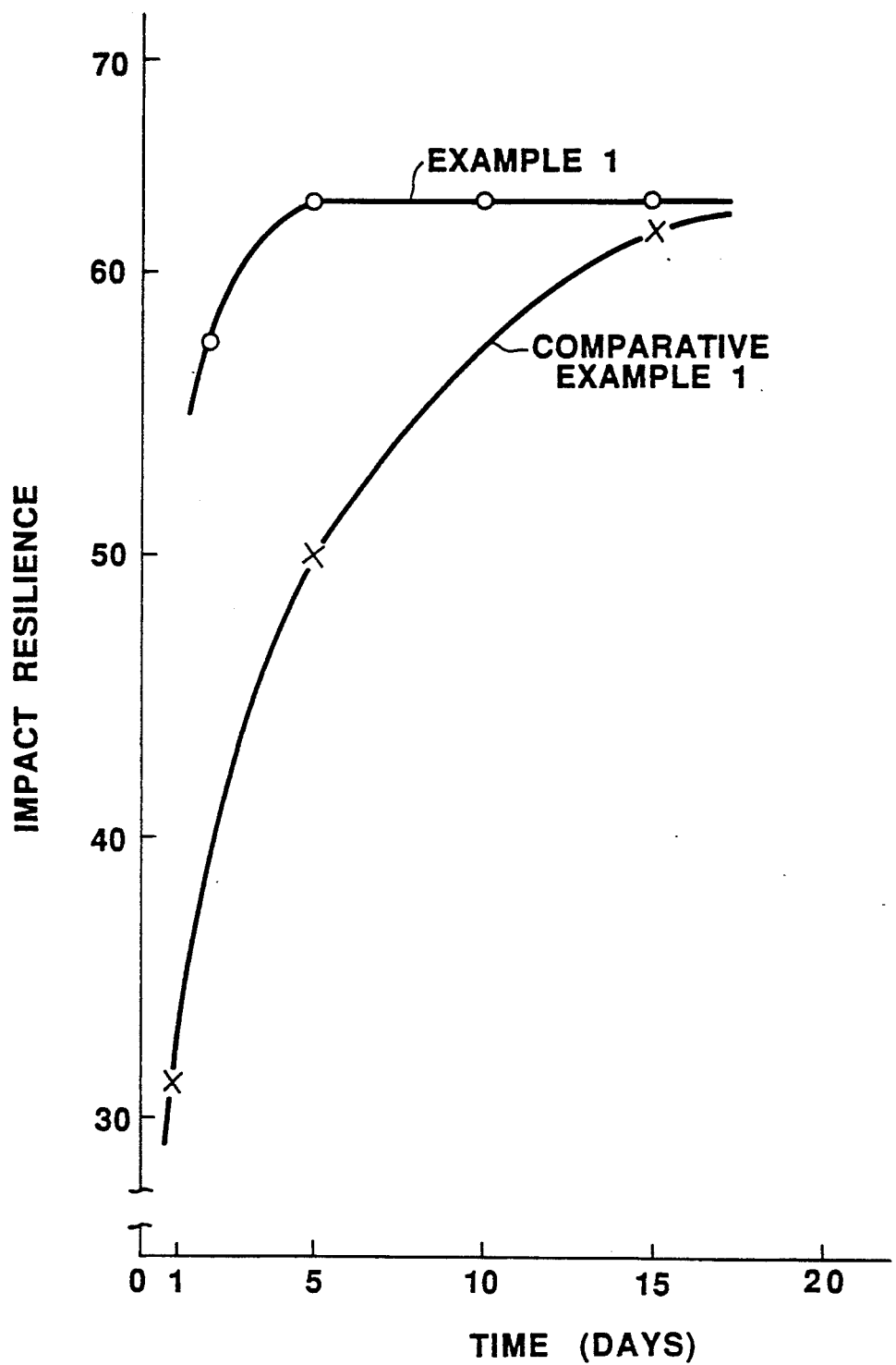

SILICONE PUTTY COMPOSITIONS

This invention relates to a silicone putty composition, and more particularly, to a silicone putty composition which has high impact resilience from immediately after preparation, provides a soft silicone putty having low plasticity, and is best suited for use in toys and dampers.

BACKGROUND OF THE INVENTION

In the prior art, silicone putty compositions are generally prepared by mixing dimethylsilicone with boron oxide and heat treating the mixture at a temperature of 100 to 2500° C. for forming a polymeric material having an increased viscosity as disclosed in Japanese patent publication No. 6944/1951. For use as putty, the polymer is blended with an appropriate amount of dimethylpolysiloxane, silica and the like to form a composition having an optimum plasticity. The silicone putty compositions thus prepared, however, must pass a structure forming time of several days to about one month from the mixing of the respective components before the silicone putty can provide certain impact resilience. That is, the conventional silicone putty compositions suffer from a wasteful storage period before use.

By blending such a silicone putty composition with silica such as fumed silica, precipitated silica or diatomaceous earth, there can be obtained silicone putty which exhibits high impact resilience from a relatively early stage. A relatively large amount of silica should be blended to this end. The resulting silicone putty composition is extremely highly plastic and hard. Because of unduly high hardness,, the composition is difficult to apply to toys and dampers.

There is a need for a silicone putty composition which exhibits high impact resilience from an early stage and provides a soft silicone putty having low plasticity.

SUMMARY OF THE INVENTION

According to the present invention, there is provided a silicone putty composition comprising (1) a diorganosiloxane of the following general formula:

$$R_nSiO_{(4-n)/2}$$

wherein R is a substituted or unsubstituted monovalent hydrocarbon group and n is a number of from 1.98 to 2.02, (2) an organopolysiloxane having a terminal alkoxy group, (3) boric acid or boron oxide, and (4) liquid paraffin.

This silicone putty composition exhibits high impact resilience from immediately after preparation, requires no structure-forming period, and provides a soft silicone putty having low plasticity. Therefore, the composition is well suitable for use in toys, dampers and the like.

BRIEF DESCRIPTION OF THE DRAWING

The only FIGURE, FIG. 1 is a graph showing a change with time of the impact resilience of silicone putty compositions of Example 1 and Comparative Example 1.

DETAILED DESCRIPTION OF THE INVENTION

A first essential component of the silicone putty composition according to the present invention is a diorganosiloxane of the following general formula.

$$R_nSiO_{(4-n)/2} \qquad (1)$$

In formula (1), R is selected from substituted or unsubstituted monovalent hydrocarbon groups having 1 to 12, preferably 1 to 8 carbon atoms, for example, alkyl groups such as methyl, ethyl and propyl groups, substituted ones thereof in which one or more hydrogen atoms are replaced by halogen atoms or cyano groups, and alkenyl groups such as vinyl and, alkyl groups. Letter n is a number of from 1.98 to 2.02. Desirably, the diorganosiloxane of formula (1) is blocked with a hydroxyl group at one or both ends thereof.

Preferably, the diorganosiloxane of formula (1) has a viscosity of about 50 to 100,000 centistokes (cs) at 25° C., especially about 100 to 10,000 cs at 25° C. With a viscosity of less than 50 cs, the composition would lose ease of processing due to tackiness or the like. A viscosity in excess of 100,000 cs would deteriorate the properties of the end putty.

A second essential component of the present composition is an organopolysiloxane. This component reacts with boric acid or boron oxide (to be described later) to form an organopolysiloxane borate to develop resilience. Any desired organopolysiloxane which is blocked with an alkoxy group at one or both ends may be used. Preferred are organopolysiloxanes of the following general formula (2) which are blocked with an alkoxy group at one or both ends.

$$R'_mSiO_{(4-m)/2} \qquad (2)$$

In formula (2), R' is selected from substituted or unsubstituted monovalent hydrocarbon groups having 1 to 12, preferably 1 to 8 carbon atoms, for example, alkyl groups such as methyl, ethyl and propyl groups, substituted ones thereof in which one or more hydrogen atoms are replaced by halogen atoms or cyano groups, and alkenyl groups such as vinyl and allyl groups. Letter m is a positive number of from 1.98 to 2.02. The terminal alkoxy groups include those having 1 to 10, preferably 1 to 5 carbon atoms, for example, methoxy, ethoxy, propoxy and butoxy groups.

Preferably, the organopolysiloxane of formula (2) has a viscosity of about 1 to 100,000 centistokes (cs) at 25° C., especially about 2 to 10,000 cs at 25° C. A viscosity of less than 1 cs would result in a putty having a less increased viscosity whereas a viscosity in excess of 100,000 cs would result in a too hard putty.

Preferably, about 10 to 500 parts, especially about 50 to 300 parts by weight of the second essential component organopolysiloxane is blended with 100 parts by weight of the first essential component or diorganopolysiloxane.

A third essential component of the present composition is boric acid or boron oxide. Preferably, about 1 to 50 parts, especially about 3 to 20 parts by weight of boric acid or boron oxide is blended with 100 parts by weight of the second essential component organopolysiloxane. Less than 1 part of boric acid or boron oxide on this basis would result in a putty having a less increased viscosity whereas more than 50 parts of boric acid or boron oxide would result in a too hard putty.

A fourth essential component of the present composition is a liquid paraffin. It is preferably blended in an amount of about 5 to 30 parts by weight per 100 parts by weight of the total of the first, second and third components. Less than 5 parts of liquid paraffin on this basis would sometimes fail to provide a high impact resilience silicone putty composition whereas more than 30 parts of liquid paraffin would detract from the inherent properties of silicone.

In addition to the above-mentioned essential component, other optional components may be blended in the composition of the present invention insofar as the objects of the invention are not impaired. Such optional components include fillers, for example, fumed silica, precipitated silica, and diatomaceous earth for reinforcement and/or extending purpose, ground quartz, fused quartz, magnesium carbonate, and calcium carbonate for extending purpose, and metal powder, organic pigments, inorganic pigments, fluorescent pigments, and dyes for coloring purpose.

The silicone putty composition of the present invention is desirably prepared by first mixing the first to third essential components and if necessary, fillers or the like, thus forming a putty-like base silicone composition, and then adding the fourth essential component or liquid paraffin and if necessary, other optional components to the base composition followed by mixing. Preferably in the preparation of the base silicone composition, the components are mixed by means of a mixer such as a kneader while they are heat treated at a temperature of about 100° to 200° C. for about 1 to 10 hours.

The silicone putty composition of the present invention exhibits high impact resilience from immediately after preparation, provides an adequately soft silicone putty, and thus finds application in a wide variety of uses such as toys and dampers.

EXAMPLE

Examples of the present invention are given below by way of illustration and not by way of limitation. All parts are by weight.

EXAMPLES 1-3 AND COMPARATIVE EXAMPLES 1-3

A kneader mixer having a volume of 1 liter was charged with 300 grams of dimethylpolysiloxane endblocked with a hydroxyl group having a viscosity of 2,000 cs, 500 grams of dimethylpolysiloxane endblocked with an ethoxy group having a viscosity of 6 cs, 6 grams of boric acid, and 10 grams of fumed silica. The components were agitated while they were heat treated at a temperature of 150° C. for one hour. There was obtained a base silicone composition, designated A, which was putty like.

Several silicone putty compositions were prepared using base silicone composition A. Table 1 shows the amounts of the components blended. The compositions were examined for impact resilience immediately after preparation and plasticity. The results are also shown in Table 1. It was also observed how the impact resilience of silicone putty compositions of Example 1 and Comparative Example 1 changed with the lapse of time. The results are shown in FIG. 1.

TABLE 1

|  | Example | | | Comparative Example | | |
| --- | --- | --- | --- | --- | --- | --- |
|  | 1 | 2 | 3 | 1 | 2 | 3 |
| Base silicone composition A | 100 | 100 | 100 | 100 | 100 | 100 |
| Liquid paraffin | 30 | 15 | 5 | — | — | — |
| Diatomaceous earth | — | — | — | — | 50 | — |
| Ground quartz | — | — | — | — | — | 50 |
| Impact resilience* | 60 | 52 | 39 | 30 | 61 | 49 |
| Plasticity** | 150 | 130 | 115 | 95 | 260 | 220 |
| Others | soft | soft | soft | low resilient, sag | hard | hard |

*according to JIS K - 6301
**according to JIS C - 2123

As seen from Table 1 and FIG. 1, the silicone putty compositions of the present invention, Examples 1-3, exhibit high impact resilience immediately after preparation and low plasticity and are soft.

Although some preferred embodiments have been described, many modifications and variations may be made thereto in the light of the above teachings. It is therefore to be understood that within the scope of the appended claims, the invention may be practiced otherwise than as specifically described.

We claim:
1. A silicone putty composition comprising:
   (1) a diorganosiloxane of the following formula:

$$R_nSiO_{(4-n)/2}$$

wherein R is a substituted or unsubstituted monovalent hydrocarbon group, n is a number from 1.98 to 2.02 and blocked with a hydroxyl group at one or both ends thereof.
   (2) an organopolysiloxane having a terminal alkoxy group,
   (3) boric acid or boron oxide, and
   (4) liquid paraffin.

2. The composition of claim 1 wherein diorganosiloxane (1) has two terminal hydroxyl groups.

3. The composition of claim 1 wherein R is methyl.

4. The composition of claim 1 wherein organopolysiloxane (2) is of the following formula:

$$R'_mSiO_{(4-m)/2}$$

wherein R' is a substituted or unsubstituted monovalent hydrocarbon group and m is a number of from 1.98 to 2.02.

5. The composition of claim 1 which contains about 10 to about 500 parts by weight of organopolysiloxane (2) per 100 parts by weight of diorganosiloxane (1).

6. The composition of claim 5 which contains about 1 to about 50 parts by weight of boric acid or boron oxide (3) per 100 parts by weight of organopolysiloxane (2).

7. The composition of claim 6 which contains about 5 to about 30 parts by weight of liquid paraffin (4) per 100 parts by weight of components (1) to (3) combined.

8. The composition of claim 1 wherein R is a substituted or unsubstituted monovalent hydrocarbon group of 1 to 12 carbon atoms.

9. The composition of claim 4 wherein R' is a substituted or unsubstituted monovalent hydrocarbon group of 1 to 12 carbon atoms.

* * * * *